March 29, 1949.
A. E. ADAMS
2,465,702
APPARATUS FOR LAPPING PART-SPHERICAL
AND SIMILAR SURFACES
Filed Oct. 9, 1946
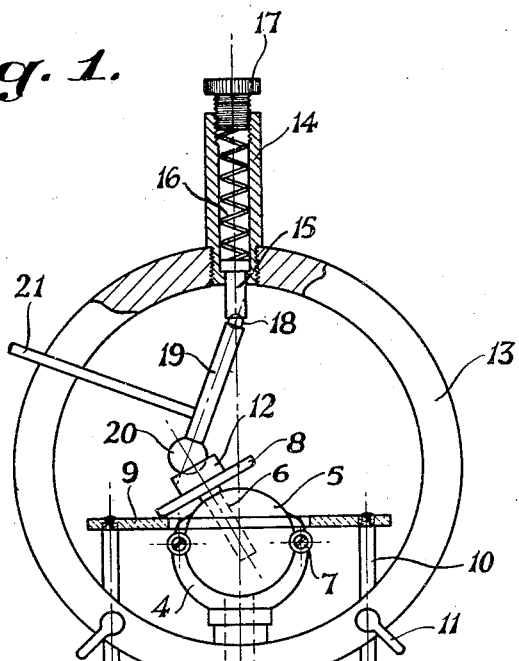
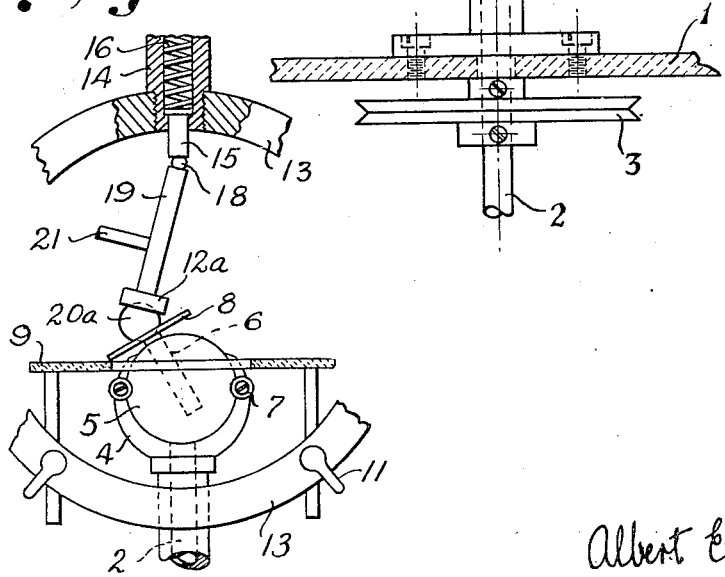
Inventor:
Albert Ernest Adams Patented Mar. 29, 1949

2,465,702

UNITED STATES PATENT OFFICE 2,465,702

APPARATUS FOR LAPPING PART-SPHERICAL AND SIMILAR SURFACES

Albert Ernest Adams, Wells, England, assignor to Scophony Limited, London, England Application October 9, 1946, Serial No. 702,831
In Great Britain October 26, 1945

4 Claims. (Cl. 51—162)

This invention relates to apparatus of the kind adapted to effect between a part-spherical lapping tool and a work-piece a relative motion consisting in part of a rotation and in part of a gyration about the centre of the spherical surfaces of the co-operating tool and work-piece, the apparatus being adapted to polish optical lenses and mirrors as well as parts of mechanisms, such for example as ball races.

It is an object of the present invention to provide such apparatus which can be used for working extremely deep, small-radius surfaces.

Another object of the invention is to provide such apparatus which exerts a constant but adjustable pressure between the lapping tool and the work-piece.

A further object of the invention is to provide such apparatus which is efficient inasmuch as the rate of polishing achieved by it is high.

Yet a further object of the invention is to provide inexpensive apparatus of the kind referred to.

A further object still is to provide such apparatus which, on the one hand, can be worked in a substantially foolproof way to produce spherical surfaces but which, on the other hand, in the hands of an experienced operator, can be made to perform more complicated operations such as the production of aspherical surfaces of a prescribed shape.

With such objects in view, the invention provides apparatus of the kind hereinbefore specified which includes two co-operating parts constituted by the lapping tool and a holder for the work-piece, a driving shaft, means on said shaft for causing one of said parts to execute both a rotation relative to said shaft and a gyration about the axis of said shaft, a strut rigid with the other of said parts and co-operating with a thrust bearing which provides a limited universal motion, means for applying an adjustable load to said thrust bearing, and means for preventing continuous rotation of said other part.

The gyratory motion of said one part is preferably such that the locus of the axis of rotation of said one part is the surface of a cone co-axial with the driving shaft, and adjusting means may be provided for varying the apex angle of said cone.

The improved apparatus may thus comprise a frame, a driving shaft journalled in said frame, a spindle carried in a bearing member adjustably mounted on said shaft in such a manner that the axes of said spindle and shaft intersect each other at a variable angle, a planet friction wheel fast on said spindle, an annulus friction ring fixed to said frame co-axially with said shaft and longitudinally adjustable relatively to said shaft, an edge of the periphery of said planet wheel engaging a face of said ring, a plunger in said frame slidable along the axis of said shaft and co-operating with the aforesaid strut by a universal joint, and variable loading means urging said plunger towards said shaft.

Two examples of the last-mentioned form of the improved apparatus will now be described in more detail as applied to the polishing of concave lenses by way of example with reference to the accompanying drawing, Fig. 1 of which shows a machine according to the invention in front elevation and partly in section, whereas Fig. 2 shows a detail of said machine with a modification applied to it.

As shown in Fig. 1, the frame of the machine is adapted to be fixed on, or incorporates, a bench 1, through which the driving shaft 2 passes vertically, its lower end being connected by belt gearing 3 to a driving motor, not shown. At the upper end of the shaft 2 is a jaw 4 in which is fitted a bearing housing 5 carrying the work spindle 6. This housing is capable of angular displacement about a horizontal axis which intersects the axes of the spindle and the driving shaft, and means such as screws 7 are provided for locking the bearing housing in the jaw 4 at any desired inclination of the spindle axis 6 to the vertical.

A planet friction wheel 8 is fast on the spindle 6 and one edge of its periphery runs on a plane annular friction gear ring 9, e. g. rubber-faced, coaxial with the driving shaft 2 and fixed to the frame 13 by means 10 which enable the ring to be raised and lowered, after loosening clamp bolts 11, so as to accommodate adjustments in the inclination to which the work spindle 6 is set. At the upper end of the work spindle 6 is a mounting 12 of known type for a lens or a block of lenses under treatment.

The upper part of the frame 13 carries a cylindrical housing 14 coaxial with the driving shaft 2 and containing a plunger 15 urged downwards by a helical compression spring 16 the upper end of which reacts on a screw plug 17 adjustably engaged in the housing. The lower end of the plunger 15 has a spherical cup engaging a ball 18 which in turn engages a spherical cup in the upper end of a strut 19 which is rigid with the part-spherical lapping tool 20. An arm 21 extending laterally from the strut 19 slidably engages a part of the frame 13 and prevents the tool 20 from rotating continuously.

In operation, the friction gearing 8, 9 causes the work to rotate, relatively to the frame 13, in a direction opposite to the direction of rotation of the driving shaft 2, and since the distance between the two centres of gyration, i. e. the centre of the said ball 18 and the point of intersection of the axes of the driving shaft 2 and work spindle 6, is constant, the pressure between the work on 12 and the lapping tool 20 is constant.

As shown in Fig. 2, the apparatus may be modified by fixing the lap 20a to the gyratory spindle 6 and the work 12a to the strut 19. Other possible modifications will readily occur to those conversant with the art.

I claim:

1. Apparatus for lapping part-spherical and similar surfaces including two parts constituted by the lapping tool and a holder for the workpiece, a driving shaft, means on said shaft for causing one of said parts to execute both a rotation about an axis forming an angle with said shaft and a gyration about the axis of said shaft, a strut rigid with the other of said parts, a thrust bearing adapted to provide a limited universal motion and having said strut fixed to one component thereof, means for applying an adjustable load to said thrust bearing, and means for preventing continuous rotation of said other part.

2. Apparatus for lapping part-spherical and similar surfaces including two parts constituted by the lapping tool and a holder for the workpiece, a driving shaft, means on said shaft for causing one of said parts to execute both a rotation relative to said shaft and a gyration about the axis of said shaft, the locus of the axis of rotation of said one of said parts being the surface of a cone coaxial with said driving shaft, a strut rigid with the other of said parts, a thrust bearing adapted to provide a limited universal motion and having said strut fixed to one component thereof, means for applying an adjustable load to said thrust bearing, and means for preventing continuous rotation of said other part.

3. Apparatus for lapping part-spherical and similar surfaces including two parts constituted by the lapping tool and a holder for the workpiece, a driving shaft, means on said shaft for causing one of said parts to execute both a rotation relative to said shaft and a gyration about the axis of said shaft, the locus of the axis of rotation of said one of said parts being the surface of a cone coaxial with said driving shaft, adjusting means for varying the apex angle of said cone, a strut rigid with the other of said parts, a thrust bearing adapted to provide a limited universal motion and having said strut fixed to one component thereof, means for applying an adjustable load to said thrust bearing, and means for preventing continuous rotation of said other part.

4. In apparatus for lapping part-spherical and similar surfaces the combination comprising a frame, a driving shaft journalled in said frame, a spindle carried in a bearing member adjustably mounted on said shaft in such a manner that the axes of said spindle and shaft intersect each other at a variable angle, a planet friction wheel fast on said spindle, an annulus friction ring fixed to said frame co-axially with said shaft and longitudinally adjustable relatively to said shaft, an edge of the periphery of said planet wheel engaging a face of said ring, a plunger in said frame slidable along the axis of said shaft, a strut joined to said plunger by a universal joint, and variable loading means urging said plunger towards said shaft.

ALBERT ERNEST ADAMS.

REFERENCES CITED

The following references are of record in the file of this patent:

UNITED STATES PATENTS

| Number | Name | Date |
| --- | --- | --- |
| 774,745 | Egolf | Nov. 15, 1904 |
| 998,101 | Laabs | July 18, 1911 |
| 1,230,530 | Stead | June 19, 1917 |
| 1,520,662 | Maynard et al. | Dec. 23, 1924 |
| 1,593,212 | Hart | July 20, 1926 |
| 1,950,785 | Capps | Mar. 13, 1934 |
| 2,371,303 | Liebowitz | Mar. 13, 1945 |

FOREIGN PATENTS

| Number | Country | Date |
| --- | --- | --- |
| 519,375 | France | June 9, 1921 |